(12) United States Patent
Hoshuyama

(10) Patent No.: US 8,520,097 B2
(45) Date of Patent: Aug. 27, 2013

(54) IMAGE PROCESSING DEVICE, ELECTRONIC CAMERA, AND IMAGE PROCESSING PROGRAM

(75) Inventor: Hideo Hoshuyama, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/929,869

(22) Filed: Feb. 22, 2011

(65) Prior Publication Data

US 2011/0141302 A1     Jun. 16, 2011

Related U.S. Application Data

(63) Continuation of application No. 12/153,518, filed on May 20, 2008, now abandoned, which is a continuation of application No. 10/730,057, filed on Dec. 9, 2003, now abandoned.

(30) Foreign Application Priority Data

Dec. 17, 2002  (JP) ................................. 2002-365476

(51) Int. Cl.
    *H04N 9/68* (2006.01)
(52) U.S. Cl.
    USPC ......................................................... 348/237
(58) Field of Classification Search
    USPC ......... 348/223, 256, 453, 645, 237; 358/504, 358/518–521; 382/167, 162, 164, 173
    See application file for complete search history.

(56) References Cited

U.S. PATENT DOCUMENTS

| | | | | |
|---|---|---|---|---|
| 5,450,216 | A  * | 9/1995 | Kasson | 358/518 |
| 5,606,632 | A  * | 2/1997 | Matsumoto et al. | 382/298 |
| 5,963,670 | A  * | 10/1999 | Lipson et al. | 382/224 |
| 6,075,563 | A  * | 6/2000 | Hung | 348/223.1 |
| 6,437,792 | B1 * | 8/2002 | Ito et al. | 345/600 |
| 6,453,072 | B1 * | 9/2002 | Hatakenaka | 382/232 |
| 2001/0016064 | A1 * | 8/2001 | Tsuruoka et al. | 382/167 |
| 2002/0060688 | A1 * | 5/2002 | Mizumoto | 345/591 |
| 2003/0012433 | A1 * | 1/2003 | Gruzdev et al. | 382/167 |
| 2003/0063299 | A1 * | 4/2003 | Cowan et al. | 358/1.9 |
| 2003/0151758 | A1 | 8/2003 | Takeshita | |

FOREIGN PATENT DOCUMENTS

| | | |
|---|---|---|
| EP | 1 231 775 A2 | 8/2002 |
| JP | A 05-244443 | 9/1993 |
| JP | A 09-009069 | 1/1997 |
| JP | A 09-051443 | 2/1997 |

* cited by examiner

*Primary Examiner* — Lin Ye
*Assistant Examiner* — Euel Cowan
(74) *Attorney, Agent, or Firm* — Oliff & Berridge, PLC

(57) ABSTRACT

An image processing device of the present invention includes a color-gamut determining part, a color-space determining part, and a color-space conversion part. The color-gamut determining part determines a color gamut as a range of color distribution from input image data. The color-space determining part determines a color space substantially covering the color gamut determined by the color-gamut determining part. The color-space conversion part converts the input image data into such image data that is rendered in the determined color space. The colors of the subject can thus be reproduced accurately from the converted image data.

10 Claims, 10 Drawing Sheets

IMAGE PROCESSING DEVICE, ELECTRONIC CAMERA, AND IMAGE PROCESSING PROGRAM

CROSS REFERENCE TO RELATED APPLICATION

This application is a continuation application of application Ser. No. 12/153,518, filed May 20, 2008, which is a continuation application of application Ser. No. 10/730,057 filed Dec. 9, 2003, the disclosure of which is incorporated herein by references in its entirety.

This application claims priority from Japanese Patent Application No. 2002-365476, filed on Dec. 17, 2002, the entire contents of which are incorporated herein by reference.

BACKGROUND OF THE INVENTION

1. Field of the Invention

The invention relates to an image processing device for converting color spaces of image data. The invention also relates to an electronic camera on which the image processing device is mounted, and an image processing program.

2. Description of the Related Art

In general, image data created by a color image processing device such as an electronic camera, a digital video camera, and a scanner is initially subjected to processings including color conversion, tone processing, and contour enhancement processing. The image data is then recorded on a recording medium such as a memory and a magnetic tape, or transmitted to external equipment via communication media. The recorded image data is reproduced, for example, as a photograph by a developing machine, a printer, etc. The transmitted image data is reproduced on a monitor as a moving image or a still image, for example.

In order to reproduce the colors of the recorded or transmitted image data accurately, the image-capturing side and the reproduction side need to process the image data by using the same standard. For this purpose, various types of standards (color spaces) for expressing colors have been established. Then, the color coordinates of the three principal colors (R, G, and B) differ from one standard to another.

FIG. 1 shows an xy chromaticity diagram showing NTSC color space and sRGB color space. Note that the horseshoe shaped area is a color range that humans are perceptible of (hereinafter, to be referred to as visible region). The image-capturing side can encode only colors inside the respective triangles with the coordinates of R, G, and B as the vertexes in the color space it uses. Similarly, the reproduction side can reproduce only colors inside the respective triangles with the coordinates of R, G, and B as the vertexes in the color space it uses. In the present invention, the range of colors that can be thus expressed in a color space, as well as the range of color distribution of a subject, shall be referred to as color gamut. As is evident from FIG. 1, the ranges of colors that can be expressed in NTSC color space and sRGB color space are smaller than the visible region. This also holds for most other color spaces (including CIE RGB and Adobe RGB (TM)).

When the color space determined according to the color filters of an image sensor does not cover the color gamut of a subject, the colors of the subject is not reproducible accurately from the image data created by this image-capturing system. Additionally, even with the image-capturing system having a color space that covers the color gamut of a subject, it is not possible to reproduce the colors of the subject with accuracy if the image data created by this image-capturing system is converted into such image data that it is rendered in a color space not covering the color gamut of the subject.

In view of this, Japanese Unexamined Patent Application Publication No. 2002-109523 has proposed a method of establishing a new color space capable of expressing all colors and capturing an image in this color space. This new color space differs from the known color spaces in the coordinates of the three principal colors. The image data based on the new three principal colors is thus converted into image data based on known three principal colors before output to an existing image output apparatus.

In general, image data yet to be compressed consists of pixels whose colors are encoded in a predetermined number of bits each (for example, 8 bits for each of the three principal colors). If encoded in a larger color space, the captured image data is thus expected to be greater in color difference per tone. Once the image data is encoded in wider tones, it is impossible to make the tones finer in subsequent processings. A greater color difference per tone results in unclear reproduced images and making it difficult to process the image data.

Besides, it is troublesome and difficult for the user to select an appropriate color space depending on the subject because he or she is required to have expertise on NTSC, sRGB, and other color spaces.

SUMMARY OF THE INVENTION

It is an object of the present invention to provide a technique for reproducing the color gamut of a subject with good chroma and tones without the necessity for the user to select a color space.

An image processing device of the present invention includes a color-gamut determining part, a color-space determining part, and a color-space conversion part. The color-gamut determining part determines a color gamut as a range of color distribution from input image data. The color-space determining part determines a color space substantially containing the color gamut determined by the color-gamut determining part. The color-space conversion part converts the input image data into image data which is rendered in the determined color space. It may be expected that the colors of the subject are accurately reproducible from the converted image data. Incidentally, the color-space conversion part herein will sometimes be referred to as color correcting part.

According to one of the aspects of the image processing device of the present invention, the color-gamut determining part divides the input image data into a plurality of image regions, calculates a hue and a chroma for each of the image regions, and determines a maximum chroma for each of the hues calculated. The color-space determining part selects a smallest color space from color spaces each having a maximum chroma equal to or higher than that of the input image data in all of the hues calculated by the color-gamut determining part.

This calculation function of the color-gamut determining part will sometimes be referred to as evaluation value calculation part, and each of the divided image regions will sometimes be referred to as a small region. Moreover, in this aspect of the image processing device, the above-described "a color space substantially containing the color gamut" corresponds to a color space having a maximum chroma equal to or higher than that of the input image data in all of the hues calculated, for example. A small color space signifies that an average of the maximum chroma determined for each of the hues is small, for example.

According to another aspect of the image processing device of the present invention, the color-gamut determining part maps the input image data onto a chromaticity diagram. Then, the color-space determining part selects a smallest color space from color spaces each containing a predetermined percentage or more of the color gamut of the input image data on the chromaticity diagram. Here, the color spaces each containing a predetermined percentage or more of the color gamut correspond to the above-mentioned color space substantially containing the color gamut. Specifically, for example, it corresponds to the color space containing the color gamut of the subject at or over a predetermined area ratio on the chromaticity diagram. The small color space here refers to a color space of a small size on the chromaticity diagram, for example.

According to another aspect of the image processing device of the present invention, the color-space conversion part transmits information on the color space determined by the color-space determining part to a destination to which the converted image data is output. Here, the information on the color space refers to several bits of digital data indicating the name of the color space, for example.

An electronic camera of the present invention includes an image-capturing part and an image processing device. The image-capturing part captures an optical image formed with a shooting lens to create image data. Incidentally, this image-capturing part refers to a part having a release button, a CPU, a focal-plane shutter, a CCD, and a signal processing part, for example.

The image processing device includes a color-gamut determining part, a color-space determining part, and a color-space conversion part. The color-gamut determining part determines a color gamut as a range of color distribution from image data obtained from the image-capturing part. The color-space determining part determines a color space substantially containing the color gamut determined by the color-gamut determining part. The color-space conversion part converts the input image data into image data which is rendered in the determined color space.

An image processing program of the present invention causes a computer to function as a color-gamut determining part, a color-space determining part, and a color-space conversion part. Here, the color-gamut determining part has a function of determining a color gamut as a range of color distribution from input image data. The color-space determining part has a function of determining a color space substantially containing the color gamut determined by the color-gamut determining part. The color-space conversion part has a function of converting the input image data into image data which is rendered in the determined color space.

According to one of the aspects of the image processing program of the present invention, the color-gamut determining part divides the input image data into a plurality of image regions, calculates a hue and a chroma for each of the image regions, and determines a maximum chroma for each of the calculated hues. The color-space determining part selects a smallest color space from color spaces each having a maximum chroma equal to or higher than that of the input image data in all of the hues calculated by the color-gamut determining part.

According to another aspect of the image processing program of the present invention, the color-gamut determining part maps the input image data onto a chromaticity diagram. Then, the color-space determining part selects a smallest color space from color spaces containing a predetermined percentage or more of the color gamut of the input image data on the chromaticity diagram.

According to another aspect of the image processing program of the present invention, the color-space conversion part transmits information on the color space determined by the color-space determining part to a destination to which the image data converted is output.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Hereinafter, embodiments of the present invention will be described with reference to the drawings.
<First Embodiment>

Figure 1:
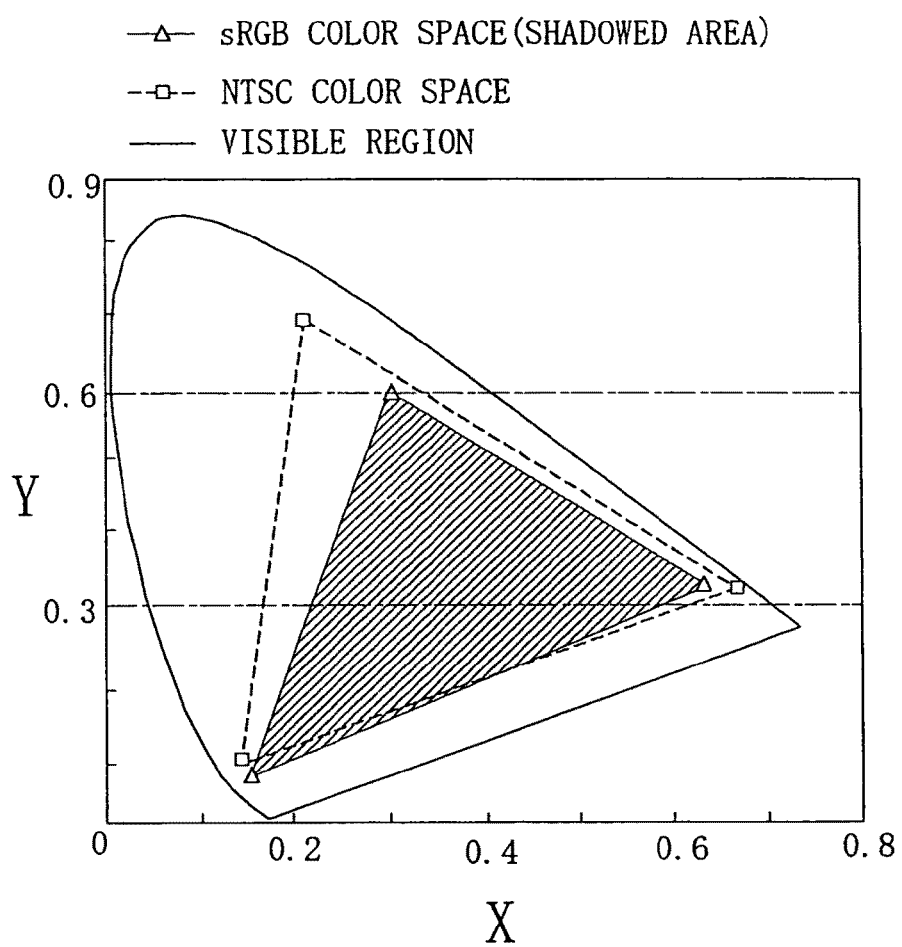
FIG. 1 is an xy chromaticity diagram showing NTSC color space and sRGB color space.
Figure 2:
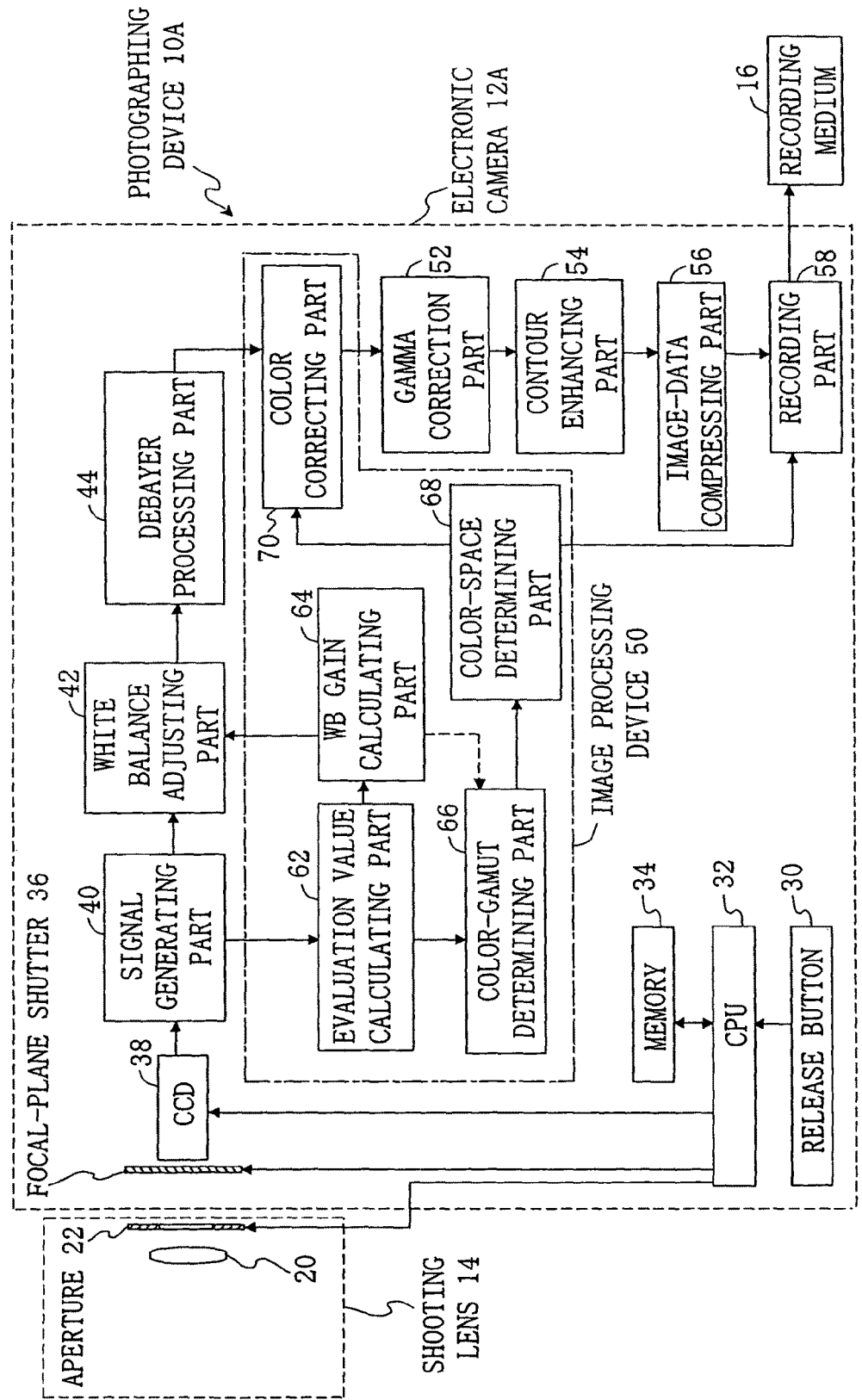
FIG. 2 is a block diagram of an electronic camera on which an image processing device according to a first embodiment of the present invention is mounted.

FIG. 2 shows a first embodiment of the present invention. In the diagram, a photographing device 10A is made up of an electronic camera 12A of the present invention, equipped with a shooting lens 14 and a recording medium 16. The shooting lens 14 consists of a lens group 20 and an aperture (diaphragm) 22.

The electronic camera 12A includes a release button 30, a CPU 32, a memory 34, a focal-plane shutter 36, a CCD 38, a signal processing part 40, a white balance adjusting part 42, a color interpolation processing part 44 (hereinafter, to be referred to as Debayer processing part 44 because it performs Debayer processing on a Bayer array as a way of example in the present embodiment), an image processing device 50 of the present invention, a gamma correction part 52, a contour enhancing part 54, an image-data compressing part 56, and a recording part 58.

The CPU 32 controls each part of the electronic camera 12A.

On its light receiving plane, the CCD 38 has color filters FR, FG, and FB (not shown) transmitting the three principal colors, red, green, and blue (hereinafter, abbreviated as R, G, and B), respectively. Each pixel of the CCD 38 thus converts only the intensity of a wavelength corresponding to one of R, G, and B into a stored charge.

The signal processing part 40 applies clamp processing, sensitivity correction processing, analog-to-digital conversion, and the like to the pixel outputs of the CCD 38 to create image data. Note that the present embodiment describes an example of the analog-to-digital conversion in which each of the R, G, and B pixel outputs is encoded in unit of 12 bits. The signal processing part 40 inputs the created image data to the image processing device 50 and the white balance adjusting part 42.

The white balance adjusting part 42 applies white balance processing to the image data by using gains for white balance processing to be described later as parameters. The white balance adjusting part 42 inputs the processed image data to the Debayer processing part 44.

The Debayer processing part 44 applies Debayer processing to the image data. This provides each pixel with 12 bits of digital data on all the three principal colors. The Debayer processing part 44 inputs the Debayer-processed image data to the image processing device 50.

The image processing device 50 includes an evaluation value calculation part 62, a WB gain calculating part 64 (WB is short for white balance), a color-gamut determining part 66, a color-space determining part 68, and a color correcting part 70. The image processing device 50 converts the image data based on the color space of the three principal colors of the color filters on the CCD 38 into image data based on an appropriate color space, and inputs the same to the gamma correction part 52 (details will be given later).

The gamma correction part 52 applies gamma correction to the input image data, and then outputs the resultant to the contour enhancing part 54. Here, for example, the gamma correction part 52 reduces the tones of pre-converted image data in which every pixel has 12 bits for each of the three principal colors so that every pixel has 8 bits for each of the three principal colors in the processed image data. The contour enhancing part 54 applies image sharpening processing to the image data, and inputs the resultant to the image-data compressing part 56.

The image-data compressing part 56 applies, for example, JPEG conversion to the image data for compression. The recording part 58 receives, from the image processing device 50, color-space information indicating in what color space the image data input from the image-data compressing part 56 is rendered. The recording part 58 records the image data onto the recording medium 16 along with this color-space information.

Figure 3:
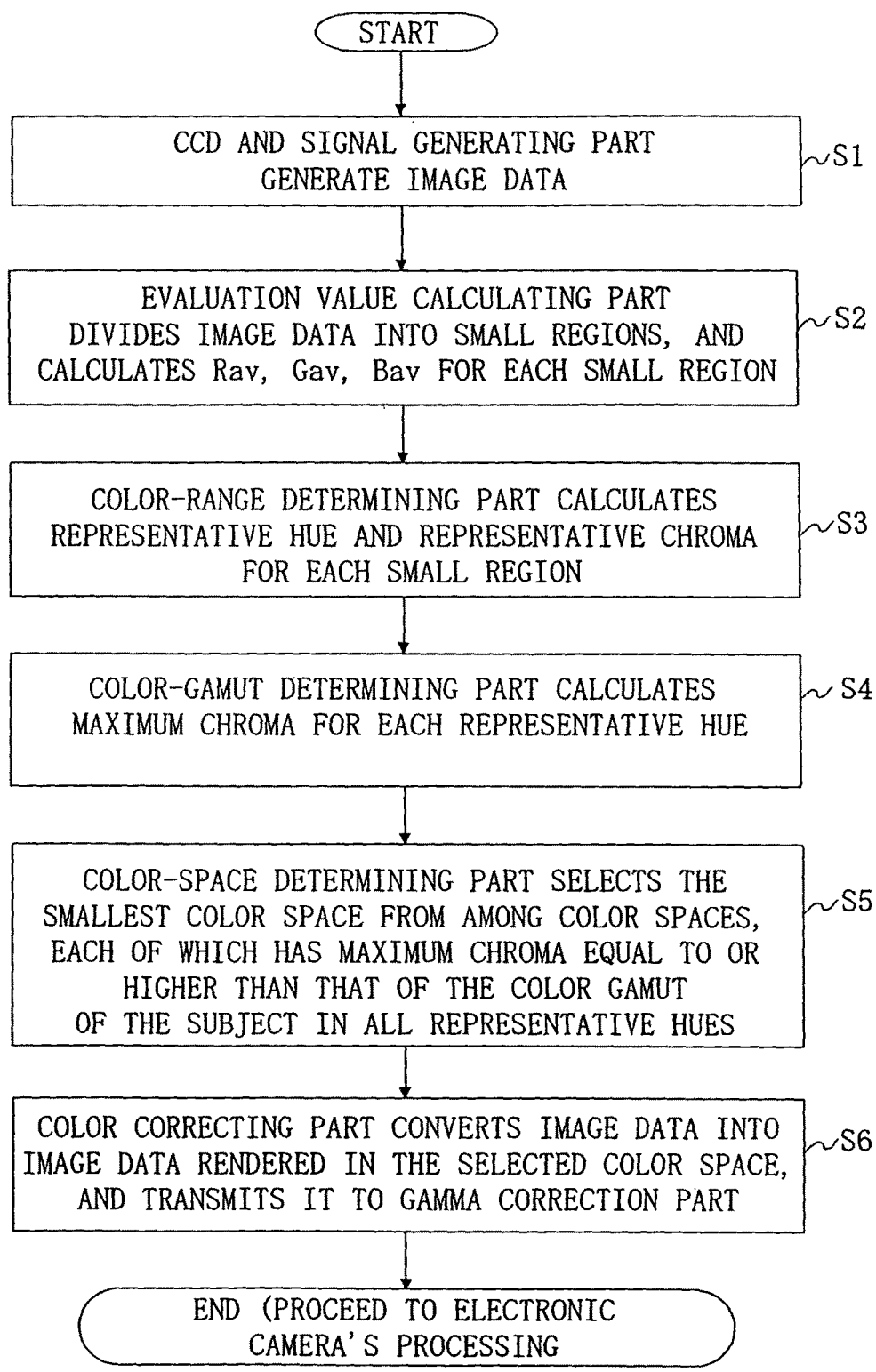
FIG. 3 is a flowchart showing the operation of the image processing device of the first embodiment.
Figure 4:
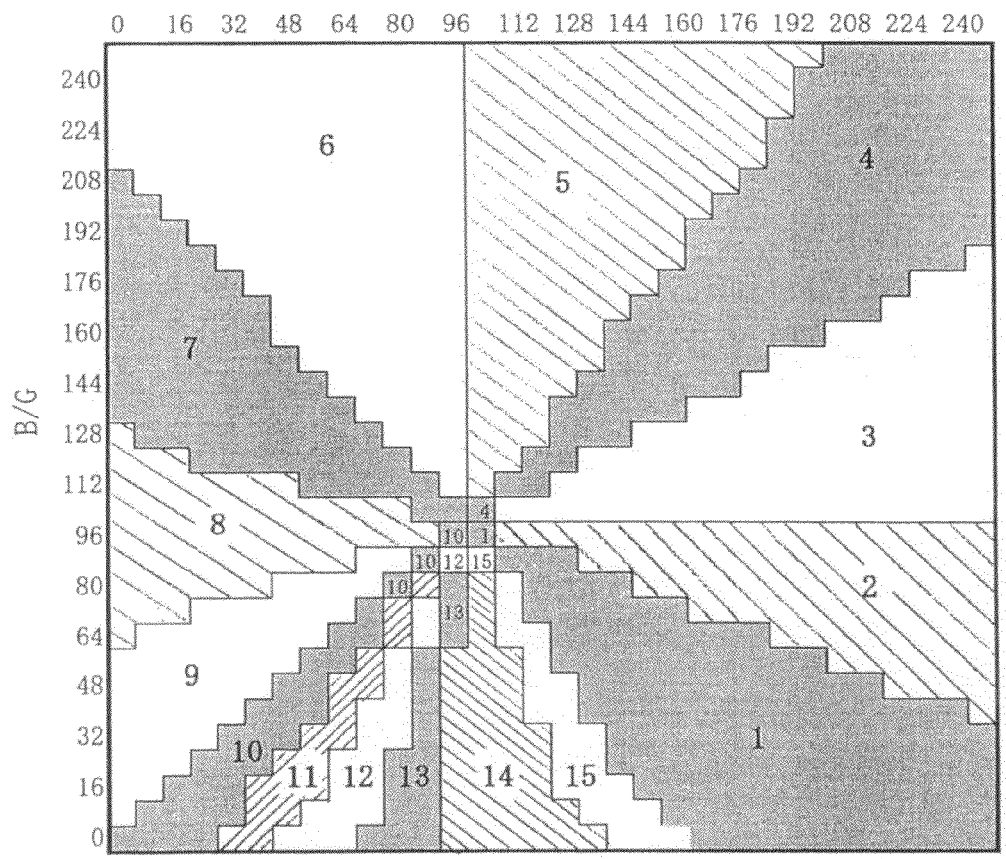
FIG. 4 is an explanatory diagram showing an example of a hue calculation table to be used by the color-gamut determining part of FIG. 2.
Figure 5:
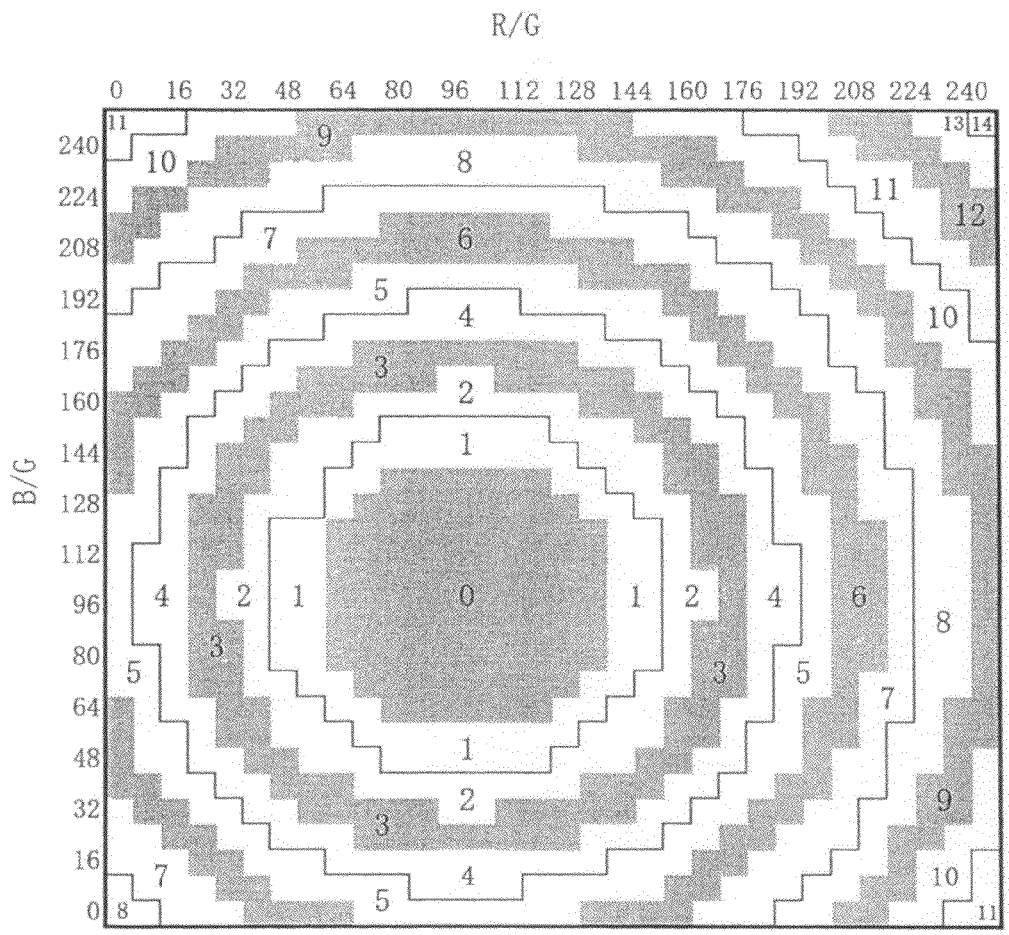
FIG. 5 is an explanatory diagram showing an example of a chroma calculation table to be used by the color-gamut determining part of FIG. 2.
Figure 6:
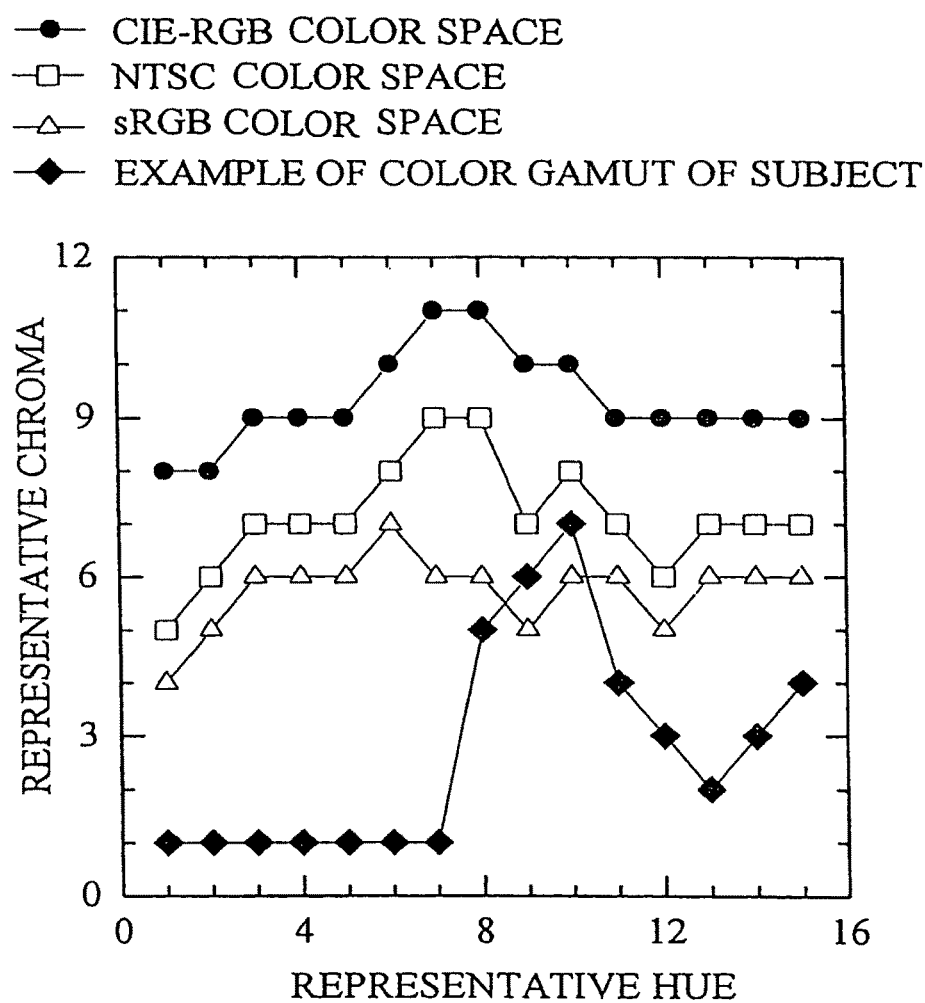
FIG. 6 shows a way of comparing the color gamut of a subject with the color gamuts of respective color spaces stored in advance by the color-space determining part of FIG. 2.

FIG. 3 is a flowchart showing the operation of the image processing device 50 described above. FIG. 4 is an example of a hue calculation table for use in the processing of the color-gamut determining part 66. FIG. 5 is an example of a chroma calculation table for use in the processing of the color-gamut determining part 66. FIG. 6 is an explanatory diagram showing a way of comparing the color gamut of a subject with the color gamuts of respective color spaces stored in advance by the color-space determining part 68. Hereinafter, the operation of the image processing device 50 will be described in the order of step numbers shown in FIG. 3, with reference to FIGS. 4 to 6. It should be appreciated that arithmetic expressions and numeric values to be seen below are given by way of example for the purpose of reference, not limitations on the present invention.

[Step S1]

According to instructions from the CPU 32, the CCD 38 converts light received from a subject through the shooting lens 14 into electric charges for storage. According to instructions from the CPU 32, the signal processing part 40 reads the stored charges from the CCD 38 to create image data. For example, the image data consists of 1000 vertical×1500 horizontal, i.e., 1.5 million pixels. The image processing part 40 inputs the created image data to the evaluation value calculation part 62. Note that this image data is not subjected to Debayer processing yet, and it consists of pixels each encoded in 12 bits for one of the three principal colors R, G, and B.

[Step S2]

The evaluation value calculation part 62 divides the image data into 8 vertical×12 horizontal, i.e., 96 regions. Hereinafter, each of the divided regions will be referred to as small region. For each small region, the evaluation value calculation part 62 calculates averages Rav, Gav, and Bav of the values (expressed by digital data) that indicate the intensities of the three principal colors R, G, and B, respectively. Specifically, the average Rav is determined by averaging the digital data on all the pixels corresponding to R in a small region. The same operations are performed for G and B to calculate Gav and Bav. The evaluation value calculation part 62 transmits Rav, Gav, and Bav to the color-gamut determining part 66 and the WB gain calculating part 64. The WB gain calculating part 64 determines gains for white balance processing based on Rav, Gav, and Bav, and transmits the same to the white balance adjusting part 42.

[Step S3]

For each small region, the color-gamut determining part 66 determines a representative hue and a representative chroma through the following procedure. Initially, R/B and B/G defined by the following equations are determined from Rav, Gav, and Bav calculated at step S2:

$$R/G = Rav \div Gav \times 100 \quad (1)$$

$$B/G = Bav \div Gav \times 100 \quad (2)$$

Next, in the hue calculation table shown in FIG. 4, the data corresponding to R/G and B/G determined is considered as a representative hue of the small region. In addition, in the chroma calculation table shown in FIG. 5, the data corresponding to R/G and B/G determined is considered as the representative chroma of the small region. Note that the hue calculation table mentioned above has values of 0 to 255 (8 bits) on both the ordinate (B/G) and abscissa (R/G), whereas FIG. 4 shows only some representative values. The same holds for the chroma calculation table of FIG. 5. The color-gamut determining part 66 considers B/G or R/G exceeding 255 in value as 255.

[Step S4]

The color-gamut determining part 66 classifies all the small regions according to the representative hues. Next, a small region having a maximum representative chroma is determined from small regions having a same value of representative hue. The representative chroma of the determined small region shall be the maximum chroma for the representative hue of this small region. In this way, the color-gamut determining part 66 determines the maximum chroma for each of the representative hues obtained at step S3. The color-gamut determining part 66 transmits the maximum chromas for the respective representative hues to the color-space determining part 68 as the color gamut of the subject.

[Step S5]

As shown in FIG. 6, the color-space determining part 68 stores in advance a relationship between representative values of hue (0, 1, ..., 15) and maximum chromas in several color spaces (such as CIE-RGB color space, NTSC color space, and sRGB color space). For reference, FIG. 6 also shows an example of the color gamut of a subject.

Then, the color-space determining part 68 compares the color gamut of each of the color spaces and that of the subject to select a smallest color space out of the color spaces that include the color gamut of the subject. Specifically, the color-space determining part 68 selects a color space having a smallest average of the maximum chroma from the color spaces each having a maximum chroma equal to or higher than that of the color gamut of the subject in all the representative hues.

FIG. 6 shows an example in which NTSC color space is selected as the optimum color space. The color-space determining part 68 transmits the information as to which color space has been selected (hereinafter, referred to as color-space information) to the color correcting part 70 and the recording part 58. Here, the transmission is effected, for example, by setting four bits of digital data for indicating the names of the respective color spaces in advance and transmitting the digital data.

[Step S6]

The color correcting part 70 receives the image data transmitted from the Debayer processing part 44. Incidentally, this image data is rendered in the color space determined by the three principal colors of the color filters on the CCD 38. The color correcting part 70 stores in advance therein matrix factors Ma, Mb, Mc, Md, Me, Mf, Mg, Mh, and Mi for each color space which are used for converting the transmitted image data into such image data that it is rendered in CIE-RGB color space, NTSC color space, sRGB color space, and the like. Note that the matrix factors Ma to Mi are intended not only for color-space conversion but also for color correction ascribable to the fact that neither the shooting lens 14 nor the CCD 38 has ideal spectral characteristics.

The color correcting part 70 selects matrix factors Ma to Mi corresponding to the color space selected at step S5. The color correcting part 70 performs color-space conversion on the transmitted image data by using the following three equations (collectively referred to as Equation (3)):

$$Rm = Rc \times Ma + Gc \times Mb + Bc \times Mc$$

$$Gm = Rc \times Md + Gc \times Me + Bc \times Mf$$

$$Bm = Rc \times Mg + Gc \times Mh + Bc \times Mi \quad (3)$$

In the foregoing equation, Rc, Gc, and Bc are pieces of digital data corresponding to the three principal colors of the image data transmitted from the Debayer processing part 44. Rm, Gm, and Bm are pieces of digital data corresponding to the three principal colors of the converted image data. The color correcting part 70 then transmits the converted image data to the gamma correction part 52.

The description so far has been made on the operation of the image processing device 50 of the present embodiment. The converted image data which is rendered in an appropriate color space in this way is subjected to the above-mentioned processings in the gamma correction part 52, the contour enhancing part 54, and the image-data compressing part 56 before recorded onto the recording medium 16 along with the color-space information.

As described above, the image processing device 50 of the present embodiment uses table data shown in FIGS. 4 and 5 to determine representative hues and representative chromas in the respective small regions of the image data. Then, with the maximum chromas for the representative hues determined as evaluation reference, the image processing device 50 determines the color gamut of the subject that is expressed by the image data based on the color space of the color filters on the CCD 38. Consequently, the color gamut of the subject can be obtained efficiently with a fewer times of operations. This results in simplifying the configuration of the image processing device 50. Moreover, as shown in FIG. 6, whether or not the individual color spaces cover the color gamut of the subject can be determined easily by simply comparing the maximum chromas for the representative hues.

Then, the smallest color space is selected from among the color spaces that cover the color gamut of the subject. More specifically, it is possible to automatically select a color space that covers the color gamut of the subject and has a minimum color difference per tone, for the image data obtained immediately after photographing and consisting of pixels whose colors are encoded in a predetermined number of bits. This holds true even if the image data is reduced in the number of bits by subsequent processings (gamma correction part 52).

In addition, the image data is converted into such image data that it is rendered in an appropriate color space selected, and thereafter it is recorded onto the recording medium 16 along with this color-space information (step S6). Consequently, reproducing the image data based on the color-space information enables the colors of the captured subject to be reproduced accurately in favorable tones.

Moreover, the user need not have expertise on color spaces for selecting a color space so that he or she can focus on taking photographs. Also, allowing the image processing device 50 to select an appropriate color space depending on the color gamut of the subject makes it possible to create better pictures. As a result, the user's usability improves greatly.

The evaluation value calculation part 62 calculates the averages Rav, Gav, and Bav of R, G, and B for each small region, and transmits the calculation results to the color-gamut determining part 66 and the WB gain calculating part 64. It is therefore possible to use the calculation results of the evaluation value calculation part 62 both for the processing of determining the color gamut of the subject and for the white balance processing. This results in simplifying the configuration of the image processings of the electronic camera 12A.

<Second Embodiment>

Next, description will be made on a second embodiment of the present invention. The present embodiment differs from the first embodiment only in that the calculations of the WB gain calculating part are also used for the processing in the color-gamut determining part (corresponding to the part shown by the broken-lined arrow in FIG. 2). Thus, in the present embodiment, the image processing device shall be designated distinctively as 50b, the WB gain calculating part as 64b, and the color-gamut determining part as 66b while the block diagram is omitted.

Figure 7:
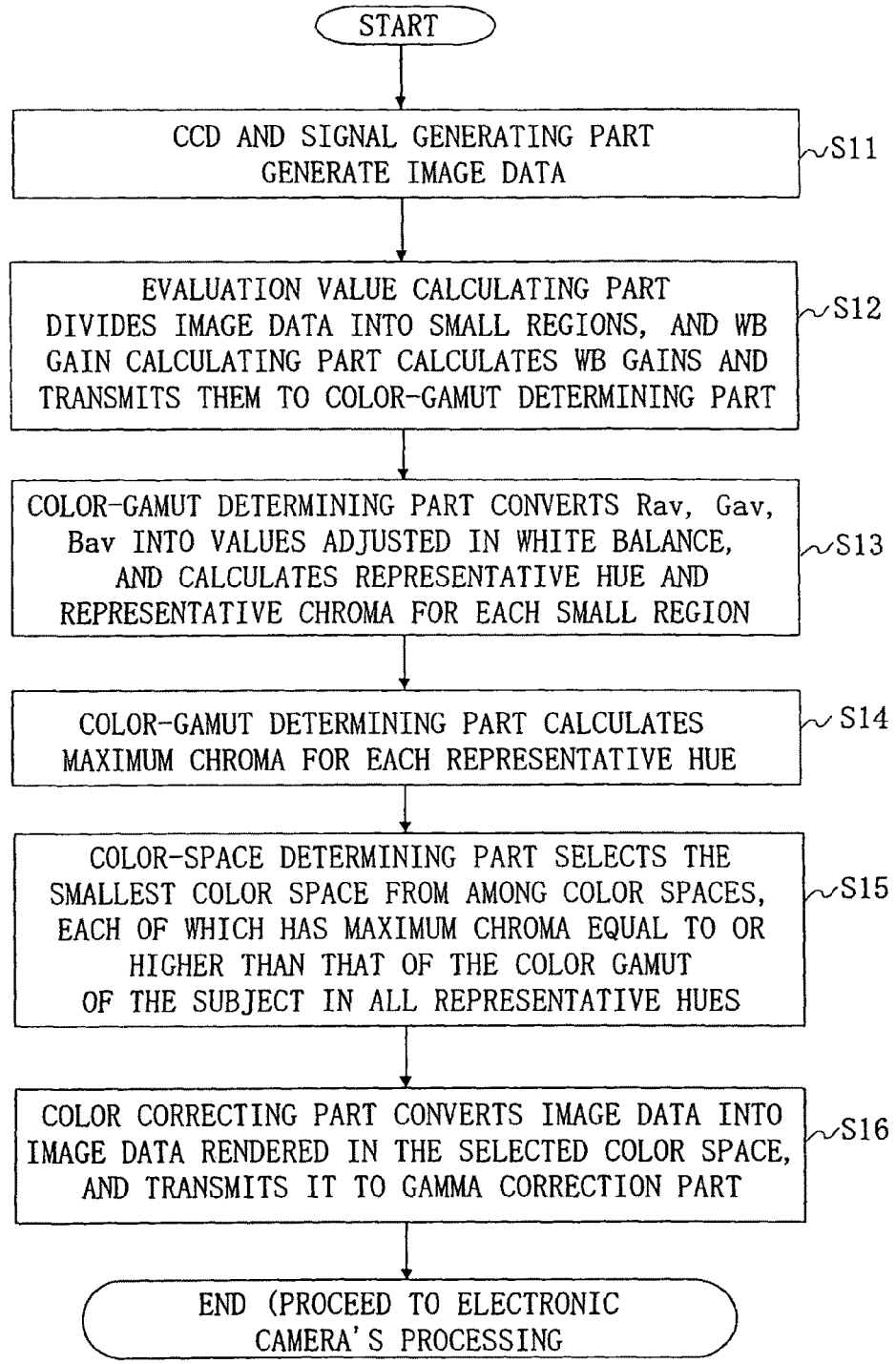
FIG. 7 is a flowchart showing the operation of the image processing device of a second embodiment.

FIG. 7 is a flowchart showing the operation of the image processing device 50b of the present embodiment. Hereinafter, the operation of the image processing device 50b will be described in the order of step numbers shown in FIG. 7. It should be appreciated that arithmetic expressions and numeric values to be seen below are given by way of example for the purpose of reference, not limitations on the present invention.

[Step S11]

As in step S1 of the first embodiment, image data is created and input to the evaluation value calculation part 62.

[Step S12]

As in step S2 of the first embodiment, the evaluation value calculation part 62 divides the image data into a plurality of small regions, and determines the averages Rav, Gav, and Bav of R, G; and B in each small region. The evaluation value calculation part 62 transmits Rav, Gav, and Bav to the color-gamut determining part 66b and the WB gain calculating part 64b. The WB gain calculating part 64b determines gains Wr, Wg, and Wb for white balance processing based on Rav, Gav, and Bav, and transmits the same to the white balance adjusting part 42 and the color-gamut determining part 66b.

[Step S13]

Based on the gains Wr, Wg, and Wb for white balance processing, the color-gamut determining part 66b converts Rav, Gav, and Bav into values Rav', Gav', and Bav' that are adjusted in white balance. This conversion method is the same as what the white balance adjusting part 42 applies to image data, being expressed by, e.g., the following three equations (collectively referred to as Equation (4)):

$$Rav'=Rav \times Wr$$

$$Gav'=Gav \times Wg$$

$$Bav'=Bav \times Wb \qquad (4)$$

As in the first embodiment, the color-gamut determining part 66b determines R/G and B/G in each small region by the following equations, and determines a representative hue and a representative chroma in each small region by using the hue calculation table of FIG. 4 and the chroma calculation table of FIG. 5.

$$R/G = Rav' \div Gav' \times 100 \qquad (5)$$

$$B/G = Bav' \div Gav' \times 100 \qquad (6)$$

The processing of the subsequent steps S14, S15, and S16 are the same as that of steps S4, S5, and S6 of the first embodiment, respectively. Description thereof will thus be omitted.

As above, the second embodiment can provide the same effects as those of the foregoing first embodiment. Besides, in the present embodiment, the color-gamut determining part 66b converts the averages Rav, Gav, and Bav of R, G, and B determined for each small region into the values Rav', Gav', and Bav' that are adjusted in white balance, and then determines representative hues and representative chromas in the respective small regions. That is, the processing of the color-gamut determining part 66b is equivalent to predicting how the image data is converted by the white balance adjusting part 42 and determining the color gamut of the subject to be expressed by the image data adjusted in white balance. As a result, it is possible to determine the color gamut of the subject more accurately regardless of the color temperature of the light source that has illuminated the subject at the time of shooting.

<Third Embodiment>

Figure 8:
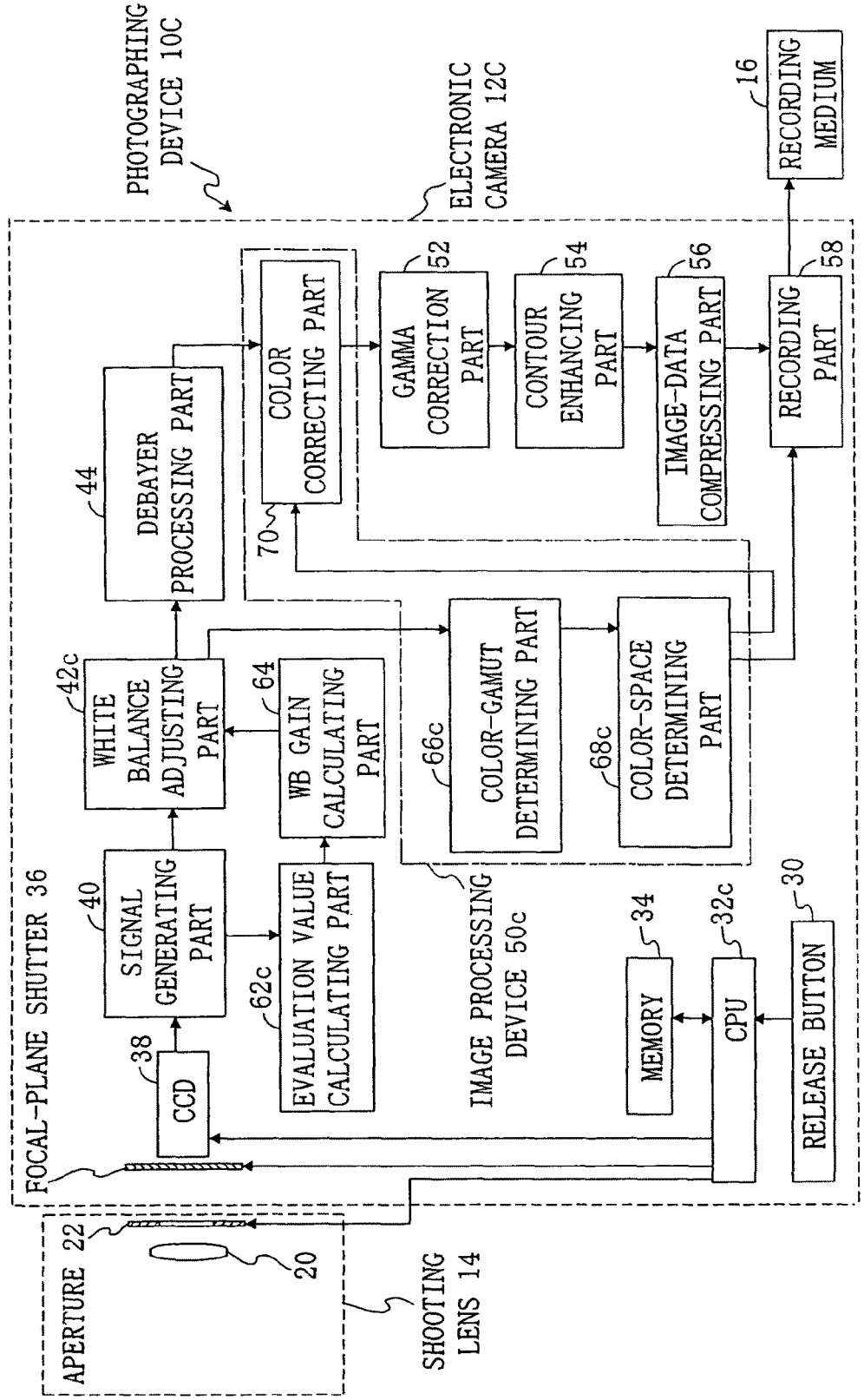
FIG. 8 is a block diagram of an electronic camera on which the image processing device according to a third embodiment of the present invention is mounted.

FIG. 8 shows a third embodiment of the present invention. The same parts as those of the first embodiment will be designated by identical reference numbers. Description thereof will be omitted. In the diagram, a photographing device 10C is made up of an electronic camera 12C of the present invention, equipped with a shooting lens 14 and a recording medium 16.

The electronic camera 12C includes the release button 30, a CPU 32c, the memory 34, the focal-plane shutter 36, the CCD 38, a signal processing part 40, an evaluation value calculation part 62C, the WB gain calculating part 64, a white balance adjusting part 42c, the Debayer processing part 44, an image processing device 50c of the present invention, the gamma correction part 52, the contour enhancing part 54, the image-data compressing part 56, and the recording part 58.

The CPU 32c controls each part of the electronic camera 12C.

The evaluation value calculation part 62c is identical to the evaluation value calculation part 62 of the first embodiment except that Rav, Gav, and Bav calculated for each small region are transmitted only to the WB gain calculating part 64.

The white balance adjusting part 42c is identical to the white balance adjusting part 42 of the first embodiment except that the image data adjusted in white balance is also input to the image processing device 50c.

The image processing device 50c includes a color-gamut determining part 66c, a color-space determining part 68c, and a color correcting part 70. The image processing device 50c converts image data based on the color space of the three principal colors of the color filters on the CCD 38 into image data based on an appropriate color space, and inputs the same to the gamma correction part 52.

Figure 9:
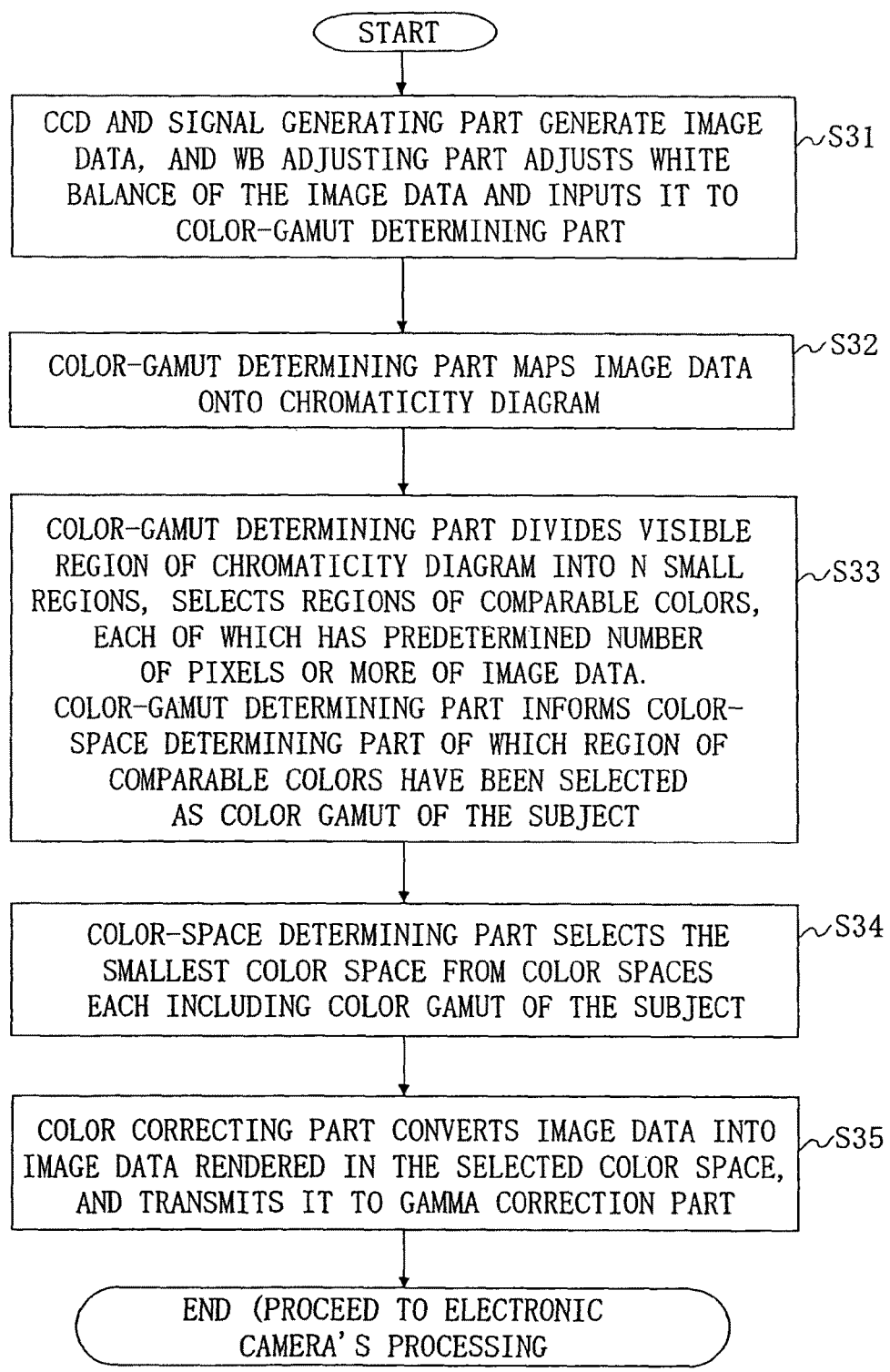
FIG. 9 is a flowchart showing the operation of the image processing device of the third embodiment.
Figure 10:
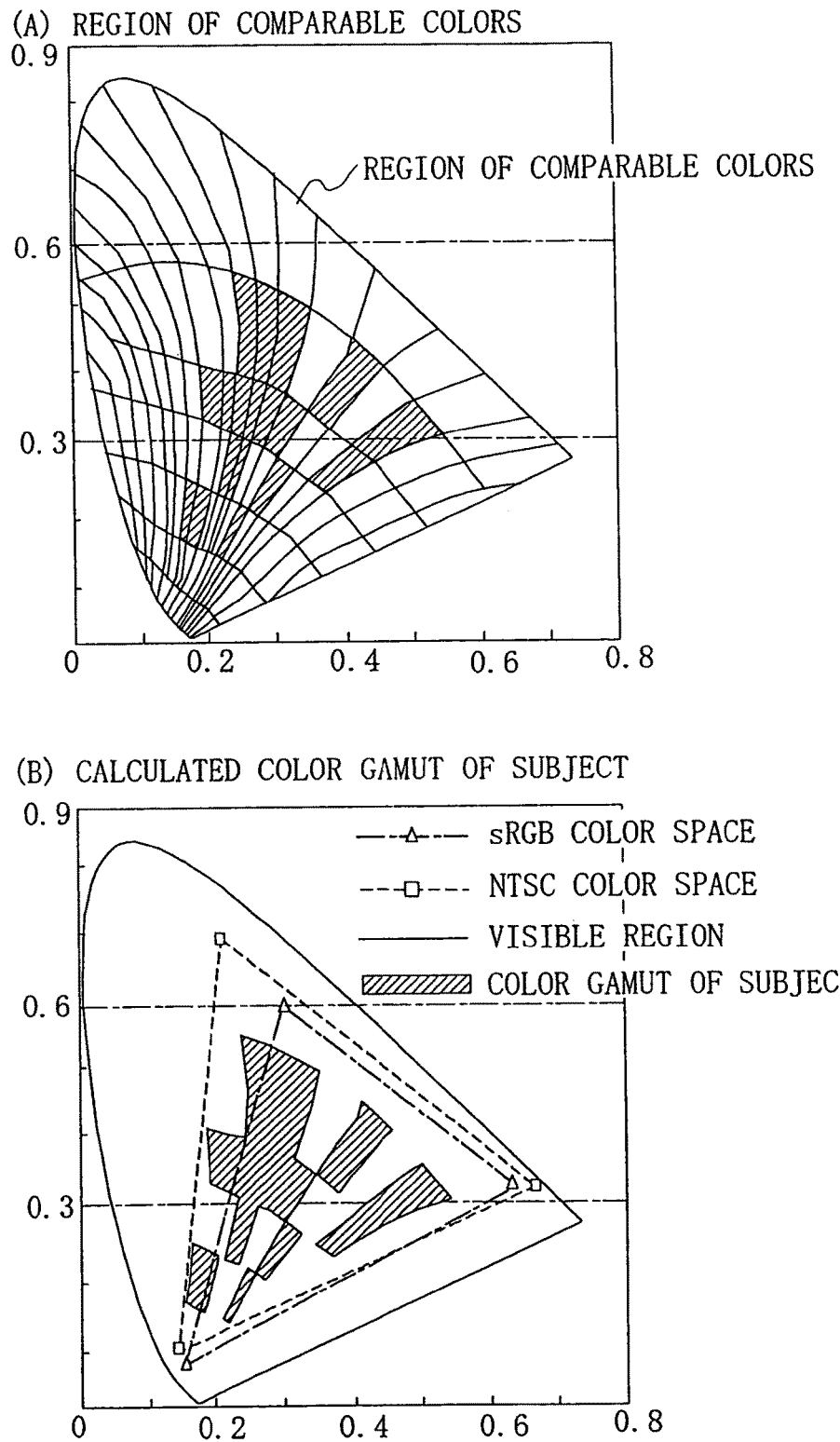
FIGS. 10 (A), (B) are diagrams for illustrating the image processing device's processings of determining the color gamut of the subject and comparing it with the color gamuts of respective color spaces stored in advance according to the third embodiment.

FIG. 9 is a flowchart showing the operation of the image processing device 50c described above. FIGS. 10 (A), (B) are diagrams for explaining the processing of determining the color gamut of the subject and comparing it with the color gamuts of respective color spaces stored in advance by the image processing device 50c. Hereinafter, the operation of the image processing device 50c will be described in the order of step numbers shown in FIG. 9, with reference to FIG. 10.

[Step S31]

The signal processing part 40 reads the stored charges from the CCD 38 to create image data, and inputs the same to the evaluation value calculation part 62c and the white balance adjusting part 42c. As in the first embodiment, the evaluation value calculation part 62c divides the image data into a plurality of small regions, and determines the averages Rav, Gav, and Bav of R, G, and B, respectively, in each small region. Based on Rav, Gav, and Bav transmitted from the evaluation value calculation part 62c, the WB gain calculating part 64 determines gains for white balance processing, and transmits the same to the white balance adjusting part 42c. The white balance adjusting part 42c applies white balance processing to the image data, and then inputs the resultant to the color-gamut determining part 66c and the Debayer processing part 44.

[Step S32]

The color-gamut determining part 66c maps the input image data (based on the color space determined by the color filters on the CCD 38) onto an xy chromaticity diagram, for example. This mapping is performed in unit of pixels, and table data is created at the same time. For example, when the image data covers three pixels that show the color corresponding to an x-coordinate of 0.3 and a y-coordinate of 0.4, a row of table data is expressed as (0.3, 0.4, 3). Such table data is created on all the coordinates within the visible region.

[Step S33]

As shown in FIG. 10(A), the color-gamut determining part 66c divides the visible region on the xy chromaticity diagram into N regions based on MacAdam ellipse, for example. Hereinafter, each of the N divided regions will be referred to as a region of comparable colors. The color-gamut determining part 66c classifies the individual rows of table data created at step S32 according to regions of comparable colors. From among the regions of comparable colors, the color-gamut determining part 66c selects ones that include T or more pixels of the mapped image data. In FIG. 10(A), the hatched area is an example of the regions of comparable colors selected here. Note that a single region including T pixels of exactly the same color can also be selected. The color-gamut determining part 66c informs the color-space determining part 68c of which regions of comparable colors have been selected, as the color gamut of the subject.

Incidentally, the value of T mentioned above may be determined according to the value of N and the total number of pixels of the image data so that a difference between the actual color gamut of the subject and the color gamut of the subject determined by the color-gamut determining part 66c falls to or below an acceptable value. The smaller the value of T, the smaller the difference.

[Step S34]

As shown in FIG. 10(B), the color-space determining part 68 stores in advance the ranges of distribution of several color spaces (such as NTSC color space and sRGB color space) on the xy chromaticity diagram. Then, the color-space determining part 68 selects the smallest color space out of the color spaces that cover the color gamut of the subject on the xy chromaticity diagram. Here, a small color space refers to a color area of a small size on the chromaticity diagram. In the example shown in FIG. 10(B), NTSC color space which covers the hatched color gamut of the subject is selected as the optimum color space. As in the first embodiment, the color-space determining part 68 transmits color-space information on which color space is selected to the color correcting part 70 and the recording part 58.

If there is no color space that fully covers the color gamut of the subject, the smallest color space is selected from among color spaces that cover the color gamut of the subject on the xy chromaticity diagram at or above a predetermined area ratio. Here, the predetermined area ratio may be set to a value which allows the ratio of the region not covered by the selected color space to the color gamut of the subject determined by the color-gamut determining part 66c to fall to or below an acceptable value.

[Step S35]

As in step S6 of the first embodiment, the color correcting part 70 converts the image data transmitted from the Debayer processing part 44 into such image data that it is rendered in the color space selected at step S34. The color correcting part 70 then transmits the converted image data to the gamma correction part 52.

The description so far has been made on the operation of the image processing device 50c of the present embodiment.

As above, the third embodiment can provide the same effects as those of the first and second embodiments described above.

<Supplemental Remarks on the Present Invention>

[1] The foregoing first and second embodiments have dealt with the cases where the image data is divided into 8 vertical× 12 horizontal, i.e., 96 regions. However, the present invention is not limited to such embodiments. If the color gamut of the subject must be determined more precisely, the image data may be divided more finely. To put a functional limitation, the image data should be divided at such a fineness that a difference between the actual color gamut of the subject and the color gamut of the subject determined by the image processing device 50 falls to or below an acceptable value (such as 1%).

[2] The first and second embodiments have dealt with the cases where the evaluation value calculation part 62 calculates, at step S2 (step S12), the averages Rav, Gav, and Bav of the three principal colors R, G, and B for each small region. However, the present invention is not limited to such embodiments. For example, values that occur with highest frequency may be determined from the digital data on all the pixels corresponding to R in the respective small regions. The values corresponding to G and B may also be determined similarly. The values occurring with highest frequency can be used in subsequent processing instead of the averages. Alternatively, maximum values Rmax, Gmax, and Bmax in the digital data on all the pixels corresponding to R, G, and B in the small regions, respectively, may be determined for use instead of the averages.

[3] The third embodiment has dealt with the case where the image data is mapped onto the xy chromaticity diagram. However, the present invention is not limited to such an embodiment. With human visual sensitivity taken into account, for example, a uv chromaticity diagram may be used instead of the xy chromaticity diagram.

[4] The first to third embodiments have dealt with the cases where the image processing device (50, 50b, 50c) performs color-space conversion on the image data before gamma processing. However, the present invention is not limited to such embodiments. Following the Debayer processing by the Debayer processing part 44, the gamma correction part 52 may perform the gamma correction before the image data is input to the color correcting part 70.

[5] The first to third embodiments have dealt with the cases where one color space is selected from among a plurality of color spaces stored in advance. However, the present invention is not limited to such embodiments. For example, it is possible to determine a triangle of a smallest size from triangles covering the color gamut of the subject on the chromaticity diagram, and establish a new color space having the vertexes of the determined triangle as the color coordinates of the three principal colors.

[6] The first to third embodiments have dealt with the cases where the image sensor (CCD 38) has a color filter array of principal colors R, G, and B. However, the present invention is not limited to such embodiments. For example, the present invention is also applicable to a color filter array of complementary colors, cyan, magenta, and yellow.

[7] The first to third embodiments have dealt with the cases where the image processing device of the present invention is used for an electronic camera. However, the present invention is not limited to such embodiments. For example, the image processing device of the present invention may be used for a scanner and the like.

[8] The processing of steps S1 to S6, steps S11 to S16, or steps S31 to S35 described above may be coded into an image processing program that is stored in a computer readable medium such as electronic memory. In this case, the same effects as those of the first to third embodiments can be obtained if the image processing program is used as part of the CPU of an electronic camera, for example.

The invention is not limited to the above embodiments and various modifications may be made without departing from the spirit and scope of the invention. Any improvement may be made in part or all of the components.

What is claimed is:

1. An image processing device comprising:
a color-gamut determining part for determining a color gamut as a range of color distribution from input image data input from an input part;
a color-space determining part for determining a color space substantially containing the color gamut determined by said color-gamut determining part; and
a color-space conversion part for converting the input image data into image data which is rendered in the determined color space and for transmitting a converted image data and information on the color space determined by said color-space determining part as information corresponding to the converted image data, wherein:

said color-gamut determining part divides the input image data into a plurality of image regions and calculates a hue and a chroma for each of the image regions to determine a maximum chroma for each of the hues calculated via a chromaticity diagram;

said color-space determining part selects a smallest color space from color spaces each having a maximum chroma equal to or higher than that of the input image data in all of the hues calculated by said color-gamut determining part; and said color-space determining part selects a smallest color space from color spaces each containing a color gamut of a subject at or over a predetermined area ratio on said chromaticity diagram when there is no space containing the color gamut of the subject.

2. The image processing device according to claim 1, wherein:

said color-gamut determining part maps the input image data onto a chromaticity diagram; and said color-space determining part selects a smallest color space from color spaces each containing a predetermined percentage or more of the color gamut of the input image data on said chromaticity diagram.

3. An electronic camera comprising:

an image-capturing part for capturing an optical image formed with a shooting lens to create image data; and the image processing device according to claim 1, for determining a range of color distribution of the created image data to determine a color space, and converting the created image data into image data which is rendered in the determined color space.

4. A non-transitory computer readable recording medium recording an image processing program for causing a computer to function as said color-gamut determining part, said color-space determining part, and said color-space conversion part according to claim 1.

5. A non-transitory computer readable recording medium recording an image processing program for causing a computer to function as said color-gamut determining part, said color-space determining part, and said color-space conversion part according to claim 2.

6. The electronic camera according to claim 3, wherein said color-space conversion part performs a color correction of imaging condition when converting the input image data into image data which is rendered in the determined color space.

7. An image processing device comprising:

a color-gamut determining part for determining a color gamut as a range of color distribution from input image data input from an input part;

a color-space determining part for determining a color space substantially containing the color gamut determined by said color-gamut determining part; and a color-space conversion part for converting the input image data into image data which is rendered in the determined color space and for transmitting a converted image data and information on the color space determined by said color-space determining part as information corresponding to the converted image data, wherein:

said color-gamut determining part maps the input image data onto a chromaticity diagram;

said color-space determining part selects a smallest color space from color spaces each containing a predetermined percentage or more of the color gamut of the input image data on said chromaticity diagram; and said color-space determining part selects a smallest color space from color spaces each containing a color gamut of a subject at or over a predetermined area ratio on said chromaticity diagram when there is no space containing the color gamut of the subject.

8. An electronic camera comprising:

an image-capturing part for capturing an optical image formed with a shooting lens to create image data; and the image processing device according to claim 7, for determining a range of color distribution of the created image data to determine a color space, and converting the created image data into image data which is rendered in the determined color space.

9. The electronic camera according to claim 8, wherein said color-space conversion part performs a color correction of imaging condition when converting the input image data into image data which is rendered in the determined color space.

10. A non-transitory computer readable recording medium recording an image processing program for causing a computer to function as said color-gamut determining part, said color-space determining part, and said color-space conversion part according to claim 7.

* * * * *